United States Patent [19]

Wallis

[11] 4,027,484
[45] * June 7, 1977

[54] MODULAR ENGINE ASSEMBLY

[76] Inventor: Marvin E. Wallis, 5535 Longfellow Road, Santa Barbara, Calif. 93111

[ * ] Notice: The portion of the term of this patent subsequent to Apr. 13, 1993, has been disclaimed.

[22] Filed: Jan. 19, 1976

[21] Appl. No.: 650,374

Related U.S. Application Data

[63] Continuation of Ser. No. 557,746, March 12, 1975, Pat. No. 3,949,556.

[52] U.S. Cl. .................................... 60/709; 60/718; 74/572
[51] Int. Cl.² ........................................ F01B 21/00
[58] Field of Search ............ 60/698, 706, 709, 711, 60/716, 718; 74/572, 751; 180/54 R, 54 C

[56] References Cited

UNITED STATES PATENTS 3,949,556   3/1975   Wallis .................................. 60/718

Primary Examiner—Allen M. Ostrager
Attorney, Agent, or Firm—Finnegan, Henderson, Farabow & Garrett

[57] ABSTRACT

A modular engine assembly incorporating a "floating" flywheel coupled to a primary engine. An auxiliary engine selectively engages the flywheel via an automatic clutch which is responsive to a torque sensor mounted on the transmission drive shaft, to provide additional power as needed.

12 Claims, 3 Drawing Figures

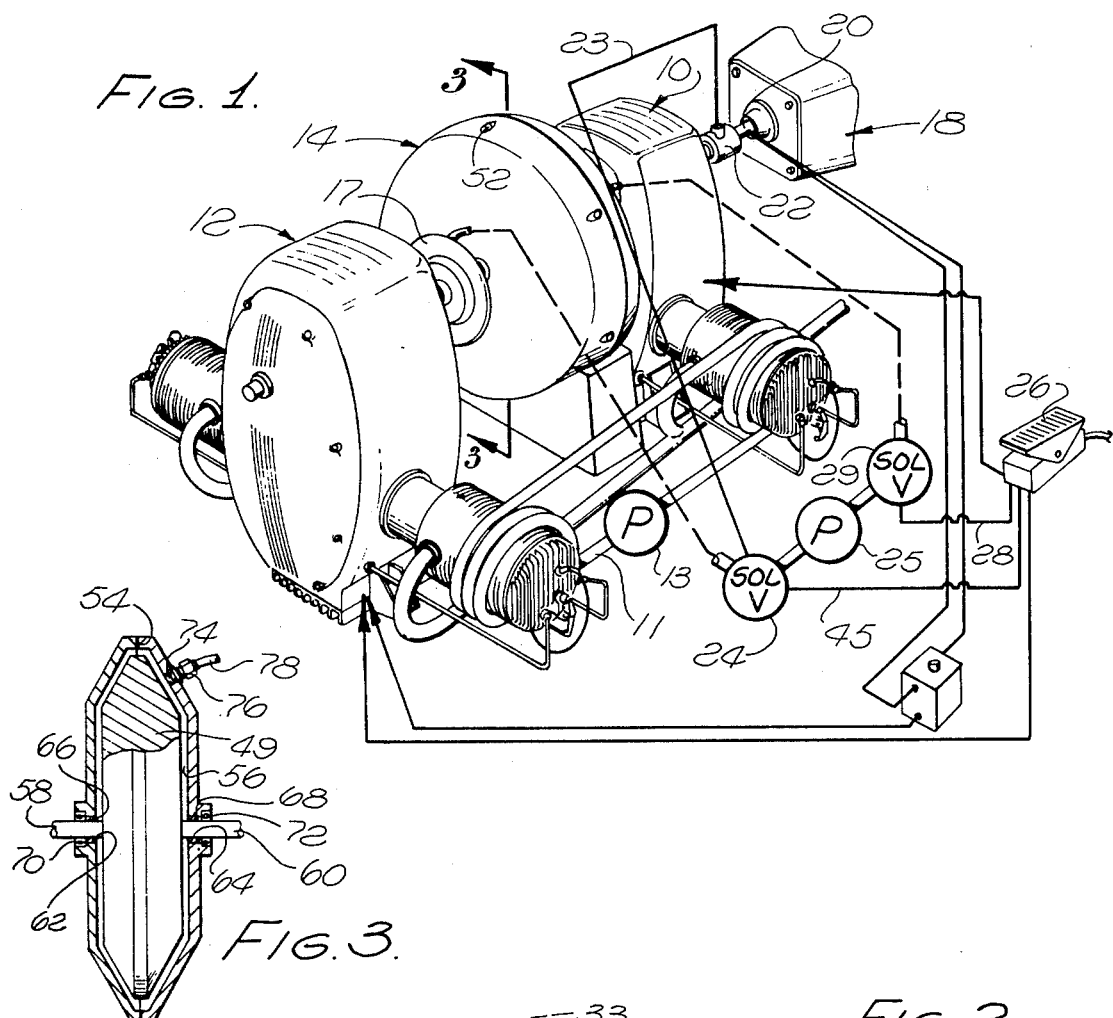
Fig. 1.
Fig. 3.
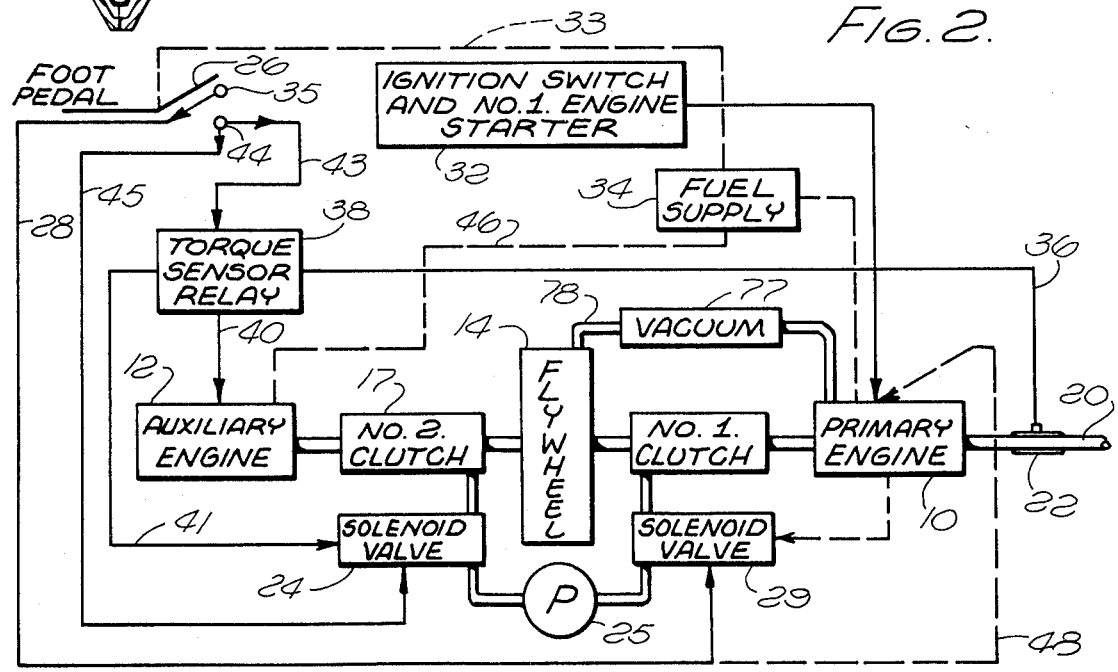
Fig. 2.

MODULAR ENGINE ASSEMBLY

FIELD OF THE INVENTION

This invention is a continuing application of prior application Ser. No. 557,746 filed Mar. 12, 1975 MODULAR ENGINE ASSEMBLY now U.S. Pat. No. 3,949,556 Apr. 13, 1976.

The fields of art to which the invention pertains include the fields of internal combustion engines, modular engines and flywheel operated devices.

BACKGROUND AND SUMMARY OF THE INVENTION

Conventional internal combustion engines operate on all cylinders regardless of power requirements, relying upon transmission shifts and/or fuel supply to vary the torque provided in accordance with need. During most normal driving cycles only a portion of available engine power is utilized, but the entire engine is used for that portion of power. The result is inherent inefficiency of operation, waster energy, excessive fuel consumption and excessive pollutant emissions.

The present invention overcomes many of the disadvantages of the usual internal combustion engine. In accordance with the present invention, a modular engine assembly is provided which incorporates a "floating" flywheel and a plurality of engines which selectively engage the flywheel via automatic clutches. Initially, the vehicle transmission is driven by a single, primary engine which also drives the flywheel. As additional power is required, as indicated by a torque sensor, or as demanded by an overriding foot pedal position, an auxiliary engine (one or more) is initially started by clutch coupling to the flywheel and thereafter aids the primary engine in driving the transmission.

Modular design enables the practical use of inexpensive, efficient, low polluting, small bore internal combustion engines (e.g. 10-90 cubic inches displacement). Synchronization of spark firing of the primary and auxiliary engine is readily accomplished by a commercially available mini-computer device. While the primary engine includes a starter and manual or automatic choke, the auxiliary engine is supplied with a fixed, idealized air/fuel ratio, such as stoichiometric or leaner. Heat transferred from the primary engine to the auxiliary engine maintains the auxiliary engine in a "ready" condition. A sealed housing is provided around the flywheel and vacuum therein is established by connection to the intake manifold of the primary engine. Additionally, the primary engine drives the alternator, air conditioner, and/or other pumps and the like, in the usual manner. Preferably, a hydrostatic transmission is utilized which provides smooth, full-range control of speed and torque. Fluid slip clutches, such as silicon fluid clutches, and preferred so as to provide full floating operation of the flywheel during braking and idling conditions.

The present modular-floating flywheel construction permits even the primary engine to stop, rather than be operating, during a temporary pause in vehicle travel, since the flywheel will act to start the primary engine as well as the auxiliary engine. The result is a further reduction in fuel consumption and air pollution.

The "floating" flywheel permits a smoothness of operation usually obtained only with rotary power engines, enables the storage of normally wasted energy and provides for rapid acceleration when required. The effective horsepower of the engine is thus effectively increased. The primary and auxiliary engines can be identical or can be different, and engines as small as 20 horsepower can be used in conjunction with a larger (50-75 horsepower) engine to effectively drive a full sized automobile. Each engine is complete within itself, having the standard balancing flywheel, common to reciprocating piston engines. Pollutant emissions are low as a result of the extremely low fuel consumption and ability to drive the auxiliary engine with a fixed air/fuel ratio. Accordingly, the present invention provides an advantageous solution to current critical problems of fuel shortage and air pollution.

BRIEF DESCRIPTION OF THE DRAWINGS

FIG. 1 is a perspective view, including schematic representations, of a dual engine-flywheel assembly in accordance with the present invention;

FIG. 2 is a schematic and block diagram of the modular assembly of the present invention and related components; and FIG. 3 is a cross-sectional view of the flywheel and housing, taken on line 3—3 of FIG. 1, in the direction of the arrows.

DETAILED DESCRIPTION

Referring to FIG. 1, a modular engine assembly is illustrated utilizing a primary engine 10 and auxiliary engine 12 between which is tandemly mounted a "floating" flywheel 14. The term "floating" is utilized to indicate that the flywheel rotates free of the engine when the engine is braked or the like. This is accomplished by means of automatic slip clutches 16 (FIG. 2) and 17 located one on each side of the flywheel 14 and by means of which the engines 10 and 12 are respectively coupled to the flywheel. The clutches 16 and 17 are preferably fluid-fed slip clutches as will be described in more detail hereinafter. The primary engine is connected to a transmission, shown schematically in FIG. 1, at 18. The transmission is preferably a hydrostatic transmission as will be described in more detail hereinafter, but any commercial transmission can be satisfactorily utilized.

Auxiliary engines are maintained in a "ready" or "go" condition by heat transferred from the primary engine 10 to the auxiliary engine 12. A preferred method for air cooled engines is by wrapping heat conductive tubing "around" the primary engine, that is filled with a liquid such as "DowTherm." A small pump 13 is driven by the primary engine. When water cooled engines are used the cooling medium is pumped through all engine simultaneously. Another method would be to utilize exhaust from the primary engine.

The primary engine 10 is connected to the transmission by means of a drive shaft 20 on which is located a torque sensor 22. As schematically indicated by the line 23, the torque sensor 22 transmits a signal to a solenoid valve 24 which actuates the auxiliary engine clutch by permitting clutch fluid to enter the clutch 17 from a pump therefor, indicated schematically at 25. Operation of the clutch 17 couples the flywheel 14 to the auxiliary engine 12. A standard accelerator foot pedal 26 is electrically connected, as indicated by the line 28, to operate a solenoid valve 29 to similarly actuate the primary engine clutch 16 to couple the primary engine 10 to the flywheel 14. As will be described hereinafter, and as indicated by the line 45, the pedal 26 is also capable of actuating the auxiliary engine clutch 17.

Operation of the assembly can be further illustrated by referring additionally to FIG. 2. The primary engine is started by means of an engine starter 32 of conventional construction. As indicated schematically by the line 33, depression of the foot pedal 26 mechanically and variably delivers fuel from a supply 34 thereof to the primary engine 10. Additionally, as the foot pedal 26 is depressed, it immediately makes electrical connection to the solenoid valve 29, as indicated at 35 and as described above, to actuate the primary engine clutch, coupling the flywheel 14 to the primary engine 10.

In an alternative embodiment, starting the primary engine 10 results in a signal to the solenoid valve 29 for actuation of the primary engine clutch 16. In this alternative mode, as long as the primary engine 10 is operating, the primary engine clutch 16 is operable.

The auxiliary engine 12 is actuated either automatically or manually. In the automatic mode, a signal is derived from the torque sensor 22 on the primary engine drive shaft 20, which is applied via line 36 to an ignition relay 38 to provide electrical ignition to the auxiliary engine 12 as indicated by the line 40. Additionally, a signal from the torque sensor actuates the solenoid valve 24, via line 41, which in turn actuates the auxiliary engine clutch 17 to couple the flywheel to the auxiliary engine 12. In the manual mode of operation, an electrical switch 44 is closed by depressing the foot pedal 26 to a low point which results in actuation of the ignition relay 38 via line 43, and of the auxiliary engine clutch 17 via lines 45 and the solenoid valve 24.

As above mentioned, the foot pedal 26 mechanically delivers fuel from the supply 34 to the primary engine (by carburetion not shown) at variable rate, proportional to depression of the foot pedal. As indicated by the line 46, the auxiliary engine receives fuel from the fuel supply 34, but the fuel is received at a fixed rate (by metering carburetion not shown) which is predetermined for optimum economy and/or pollution reduction. Accordingly, during normal operation the vehicle containing the modular engine, the foot pedal is depressed to provide variations in speed and/or power, in the usual manner, but when it is desired to accelerate, the foot pedal can be depressed to its bottommost position whereupon the switch 44 is closed, actuating the auxiliary engine clutch 17 and auxiliary engine ignition. The flywheel 14 then serves to start the auxiliary engine 12 which thereby adds power to the primary engine via the clutches 16 and 17.

It will be appreciated that the major components hereinabove referred to are state of art and in most cases, commercially available. As indicated, one can utilize duplicate engines for the primary engine 10 and auxiliary engine 12 or one can use different engines. Preferably, the primary engine 10 is the more powerful of the two or more engines utilized and can conveniently range in horsepower from 20 to 75 horsepower and the auxiliary engine can range in power from 10 to 50 horsepower. With a primary engine of about 65 horsepower, only a single auxiliary engine of about 45 horsepower is needed for the ordinary 5 or 6 passenger vehicle. With such modest horsepower requirements for each engine, one can choose from any number of inexpensive, efficient small engines whether they be rotary, reciprocal, two-stroke, four-stroke, diesel, or otherwise. To exemplify a particular embodiment, one can use a BMW Model R90/6 engine, with 65 horsepower, as the primary engine 10. As the auxiliary engine 12, one can use a BMW Model R/60/6 engine of 45 horsepower. Both engines are two cylinder, four-stroke horizontally opposed engines which are air cooled and constructed of a light alloy material providing low weight. The 65 horsepower engine develops a maximum torque of about 53 ft/lb at 5500 rpm, has a bore of 3.5 inches, a stroke of 2.8 inches and a capacity of 55 cubic inches for a compression ratio of 9:1. The 45 horsepower engine has a maximum torque of about 35 ft/lb at 5000 rpm, a bore of 2.9, inch, a stroke of 2.8 and a capacity of 36.5 cubic inches for a compression ratio of 9.2:1.

The automatic clutches 16 and 17 are preferably fluid clutches such as the silicon fluid clutch available from the Fluid Power Division of the Eaton Corporation, Marshall, Michigan. Such clutches are composed of facing members which are formed with annular grooves so as to intermesh. Viscous silicon fluid is introduced into the grooves through the solenoid valve 24 or 29 or by means of an automatically operated slide valve. The silicon fluid enters the drive chamber between the mating clutch surfaces and, as a result of viscous shear operation, the drive member drives the follower member. The clutch has no metal to metal contact. Accordingly, without the introduction of the silicon fluid, the unit effectively disengages. When engaged, the unit has a measure of slippage permitting the auxiliary engine 12 to smoothly adjust to power demand. With respect to the primary engine 10, after reaching a given rpm, such as 500–2000 rpm, the primary engine clutch 16 engages the flywheel bringing it up to the same rpm as the engine (which generally operates at about 2000–8000 rpm during ordinary vehicle travel). Alternatively, if required for any particular engine utilization, the clutch can be designed so that the primary engine engages the floating flywheel immediately upon start-up.

In the preferred operation, when the brakes are applied the primary engine clutch 16 automatically disengages (as do other clutches if otherwise operative) and the flywheel 14 continues to rotate free of all engines. The primary engine can then be used for braking. When power is again required, energy stored up in the flywheel 14 helps to bring the primary engine to operating speed and to immediately start the auxiliary engine 12 if the torque sensor 22 signals that operation of the auxiliary engine 12 is required.

In an alternative embodiment, control of the primary engine 10 is assigned to the foot pedal 26 so that simultaneous depression of the foot pedal is required for ignition of the primary engine 10. Such alternative control mode is shown by the dashed line 48 in FIG. 2. In this mode, one would start the primary engine 10 by depressing the foot pedal 26 and concurrently turning the ignition switch and starter 32. One would keep the primary engine 10 running sufficiently long to engage the flywheel 14 and stabilize the same at high speed. Thereafter, the primary engine 10 would stop when the foot pedal is in its uppermost position. Accordingly, one can idle with only the flywheel running during normal short pauses. The flywheel then serves to start the primary engine 10 and/or both the primary engine 10 and auxiliary engine 12, when the foot pedal 26 is depressed to actuate the solenoid valve 29 and/or both valves 24 and 29.

Referring to FIG. 3, the flywheel includes a solid member 49 formed of steel and having a weight which can range from 60-150 lbs. Preferably, the solid flywheel member 49 is about 16 in diameter, about 3.5 in thickness through a 9 diameter central portion and tapering to about 1 thickness at its edges. The solid flywheel member 49 is enclosed within a housing 50 which is bolted (at 52 in FIG. 1) through flanges about a gasket 54 so as to seal the housing and form a chamber 56 between the inner housing wall and the solid flywheel member 49. The solid flywheel member 49 is centrally formed with front and rear shafts 58 and 60, respectively, which are journaled for rotation through centrally formed housing openings 62 and 64, respectively. Bearing seals 66 and 68 and bearings 70 and 72 are carried by the housing 50 to facilitate sealed rotation of the flywheel shafts 58 and 60. Additionally, an opening 74 is formed in the side of the flywheel housing 50 and a nipple 76 is threaded into the opening 74. Referring additionally to FIG. 2, flexible tubing 78 connects the nipple 76 to the intake manifold of the primary engine 10 to provide a vacuum 77 within the flywheel chamber 56.

The torque sensor 22 can be of any commercial type and is mounted on the drive shaft 20 connecting the primary engine 10 to the transmission 18. A suitable torque sensor 22 is a torsional variable differential transformer type such as that sold by LeBow Associates, Inc., Troy, Michigan. This type of sensor measures the torsional wind-up of a shaft. The drive shaft 20 is made of nonmagnetic material and the LeBow torque sensor 22 includes a sleeve of magnetic material which is mounted on the drive shaft 20. The sleeve has slots that partially close on one side and open on the other side as the shaft twists due to torque. The sleeve portion of the shaft rotates in a magnetic field produced by current carried by a stationary coil mounted in the torque sensor housing. The shaft differentially couples this magnetic field to stationary secondary coils also mounted in the housing. The associated circuitry is designed so that when no torque is being transmitted, the net voltage output is zero. As the shaft twists due to torque, magnetic path differentials are indicated as a voltage output directly proportional to the torque but independent of the rotational speed.

The transmission 18 is preferably a hydrostatic drive which makes possible smooth transmission of the engine horsepower to the drive wheels of the vehicle. A particularly useful transmission is one which serves as a hydrostatic transmission, transmitting all power hydraulically during start-up, but which after start-up transmits most of its power mechanically with a small portion supplied hydraulically. Such a transmission is sold by Sunstrand Corporation, Rapid City, Iowa, under the designation DMT. In the hydrostatic mode, power is transmitted by means of a variable displacement pump and a fixed displacement hydraulic motor. Change to mechanical transmission takes place with no power interruption, the power path being split between the mechanical and hydraulic patches. Such dual mode operation assures maximum power at all speeds.

It will be appreciated that the foregoing description generally has been with respect to commercially available components and that modification thereto in accordance with the principles of the present invention can be readily made. For example, the solid flywheel member 49 can be curved to provide aerodynamic surfaces since the vacuum applied to the flywheel chamber 56 is only a partial vacuum. Other types of transmissions could be used and one could use two or three or even more auxiliary engines. Other changes can be made in keeping with the present inventive concepts as reflected in the claims appendant hereto.

I claim:

1. A modular engine assembly for connection with a transmission driven thereby comprising:
   a primary engine,
   means for starting said primary engine,
   means for connecting said primary engine to the transmission for driving the latter by said primary engine,
   an auxiliary engine,
   means for selectively coupling and decoupling said auxiliary engine and said primary engine one to the other for driving the transmission selectively by said primary engine or both said primary engine and said auxiliary engine,
   and means for starting said auxiliary engine including means for storing kinetic energy developed by said primary engine and applying said kinetic energy to said auxiliary engine to assist in starting said auxiliary engine.

2. An assembly according to claim 1 wherein said storing and applying means comprises a flywheel.

3. An assembly according to claim 2 wherein said coupling and decoupling means includes a first clutch for engaging said flywheel and said primary engine and a second clutch for engaging said flywheel and said auxiliary engine, and means for selectively actuating said first clutch to drivingly engage said flywheel and said primary engine and said second clutch to drivingly engage said flywheel and said auxiliary engine.

4. An assembly according to claim 1 wherein said storing and applying means comprises a rotating mass driven by said primary engine.

5. An assembly according to claim 4 wherein said coupling and decoupling means includes a clutch disposed between said driven mass and said auxiliary engine, and means for actuating said clutch.

6. An assembly according to claim 5 wherein said starting means includes means for sensing a load on said primary engine and providing a signal responsive to sensing a predetermined load thereon, and means responsive to said signal for actuating said clutch to couple said driven mass and said auxiliary engine.

7. An assembly according to claim 5 wherein said auxiliary engine drives the transmission through said driven mass and said primary engine when said clutch is actuated.

8. An assembly according to claim 1 including means for transferring heat from said primary engine to said auxiliary engine thereby to maintain said auxiliary engine in a ready condition.

9. A modular engine assembly for connection with a transmission driven thereby said assembly comprising:
   a primary engine,
   means for starting said primary engine,
   an auxiliary engine,
   means for supplying fuel to said primary engine and said auxiliary engine for operation thereof; and
   means for selectively coupling and decoupling said primary engine and said auxiliary engine one to the other for driving the transmission selectively by said primary engine or by both said primary engine and said auxiliary engine;

means for starting said auxiliary engine including means for storing kinetic energy developed by said primary engine, first means for selectively coupling and decoupling said primary engine and said storing means one to the other whereby at least part of the kinetic energy developed by said primary engine is stored when coupled to said storing means, and second means for selectively coupling and decoupling said storing means and said auxiliary engine and applying the stored kinetic energy to said auxiliary engine to assist in starting the same when coupled to said storing means.

10. The engine assembly of claim 9 wherein said starting means includes means for sensing torque applied by said first engine to the transmission, said starting means operating when the torque sensed is above a predetermined magnitude.

11. The engine assembly according to claim 9 wherein said auxiliary engine drives the transmission through said first means, said second means, storing means and said primary engine when said auxiliary engine is coupled to said primary engine.

12. The engine assembly of claim 9 including means for transferring heat from said primary engine to said auxiliary engine thereby to maintain said auxiliary engine in a ready condition.

* * * * *